United States Patent
Pietron et al.

(10) Patent No.: US 9,726,280 B2
(45) Date of Patent: Aug. 8, 2017

(54) TRANSMISSION CALIBRATION TOOL

(71) Applicant: Ford Global Technologies, LLC, Dearborn, MI (US)

(72) Inventors: Gregory Michael Pietron, Canton, MI (US); Jason Meyer, Canton, MI (US); Yuji Fujii, Ann Arbor, MI (US); Diana Yanakiev, Birmingham, MI (US); Joseph F. Kucharski, Livonia, MI (US); Nimrod Kapas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 14/668,190

(22) Filed: Mar. 25, 2015

(65) Prior Publication Data

US 2016/0281845 A1 Sep. 29, 2016

(51) Int. Cl.
*F16H 61/00* (2006.01)
*F16H 61/06* (2006.01)
*F16H 59/14* (2006.01)
*F16H 59/38* (2006.01)
*F16H 3/66* (2006.01)

(52) U.S. Cl.
CPC .......... *F16H 61/061* (2013.01); *F16H 3/66* (2013.01); *F16H 59/14* (2013.01); *F16H 59/38* (2013.01); *F16H 2059/147* (2013.01); *F16H 2059/148* (2013.01); *F16H 2059/385* (2013.01); *F16H 2061/0068* (2013.01); *F16H 2061/0087* (2013.01); *F16H 2061/0093* (2013.01); *F16H 2061/064* (2013.01); *F16H 2200/0052* (2013.01); *F16H 2200/201* (2013.01); *F16H 2200/2043* (2013.01); *F16H 2200/2066* (2013.01); *F16H 2342/044* (2013.01)

(58) Field of Classification Search
None
See application file for complete search history.

(56) References Cited

U.S. PATENT DOCUMENTS

| 7,145,442 B1 | 12/2006 | Wai |
| 7,644,812 B2 | 1/2010 | Simpson et al. |
| 8,255,130 B2 | 8/2012 | Fujii et al. |

(Continued)

OTHER PUBLICATIONS http://www.fev.com_fileadmin_user_upload_Media_EngineeringServices_CalibrationMethods_186_TecInfo_TOPexpert_Trace_Transmission_Calibration_Expert.pdf, Sep. 30, 2011, 1 page.

(Continued)

*Primary Examiner* — Edwin A Young
(74) *Attorney, Agent, or Firm* — James Dottavio; Brooks Kushman P.C.

(57) ABSTRACT

A transmission calibration tool automatically generates a detailed gearbox model based on a user input transmission topology description. During transmission calibration, the tool accepts inputs from transmission speed and torque sensors and estimates component torques for each gear element and each shift element. Following a shift or other transmission event, the calibration tool plots the component torques as a function of time, permitting the calibration engineer to better understand what is occurring during the event, and thus reducing the time required for calibration. The calibration tool also adapts several transmission component models and outputs the adapted models to provide insight into actual transmission component behavior.

17 Claims, 11 Drawing Sheets

(56) References Cited

U.S. PATENT DOCUMENTS

| | | |
|---|---|---|
| 8,510,003 B2 | 8/2013 | Yanakiev et al. |
| 8,706,369 B2 | 4/2014 | Yanakiev et al. |
| 2011/0313630 A1* | 12/2011 | Stoller .................. F16H 61/421 701/60 |
| 2013/0345022 A1 | 12/2013 | Yanakiev et al. |
| 2014/0379177 A1* | 12/2014 | Takasaki ................ B64D 45/00 701/14 |

OTHER PUBLICATIONS www.testing-expo.com_usa_08conf_pdfs_day_1_12_AVL_Gianluca%20Vitale.pdf, Oct. 22, 2008, 17 pages.

* cited by examiner

TRANSMISSION CALIBRATION TOOL

TECHNICAL FIELD

This disclosure relates to the field of vehicle controls. More particularly, the disclosure pertains to a tool to assist in the calibration of an automatic transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as clutches and brakes. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction clutches or brakes. The controller regulates the torque capacity of the shift element by regulating an electrical current to a solenoid, which adjusts a force on a valve which, in turn, adjusts a pressure in a hydraulic circuit.

Most transmissions are equipped with a launch device. When the vehicle is stationary or moving very slowly, the gearbox input speed is less than the minimum operating speed of the engine. A launch device transmits torque from the engine to the gearbox input while permitting the engine to rotate at an acceptable speed. A common launch device is a torque converter which includes an impeller driven by the engine and a turbine driving the gearbox input. Torque is transferred from the impeller to the turbine hydro-dynamically. Many torque converters also include a hydraulically controlled lock-up clutch that couples the impeller to the turbine, bypassing the hydro-dynamic power transfer path to improve efficiency at higher vehicle speeds. Other transmissions use an actively controlled launch clutch as a launch device.

A modern automatic transmission is controlled by a microprocessor which adjusts the torque capacity of each shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible. The controller makes these determinations using computer code called the control strategy. The control strategy often includes a large number of calibratable parameters. Before a new vehicle design is mass produced for sale to the public, engineers must set the values of these calibratable parameters. The most common process for setting these values involves driving physical prototype vehicles through a large number of scenarios, observing whether the vehicle executes each scenario in a pleasing manner, and if not, adjusting the values of relevant calibratable parameters and repeating the scenario until the result is pleasing. Scenarios include, for example, shifts from particular gear ratios to particular gear ratios at particular speeds and accelerator pedal positions with particular environmental conditions. Due to the large number of scenarios and large number of calibratable parameters, the calibration process is very time consuming and costly.

SUMMARY OF THE DISCLOSURE

A transmission calibration tool includes a user interface, a transmission interface, a processor, and a display. The transmission interface accepts a description of a gearbox topology. For example, the topology may include: i) a list of gearing components such as planetary gear sets, ii) a list of fixed connections among the gearing components, an input shaft, and an output shaft, iii) a list of shift elements that selectively couple gearing components, a stationary member, the input shaft, and the output shaft, iv) a list of transmission states indicating which shift elements are engaged to establish each state, v) a list of speed sensors, and vi) a list of torque sensors. The transmission interface accepts signals from the speed sensors and torque sensors. The processor is programmed to estimate component torques based on the topology description and the sensor signals and to plot the component torques on the display. The component torques may be, for example, the torque transmitted by a shift element or the torque exerted by a gearing component.

A method of calibrating a transmission includes accepting a description of a gearbox topology, developing a model based on the topology that relates transmission component torques to one or more speed sensor readings and one or more torque sensor readings, estimating component torques during a shift event using the model and sensor signals, and displaying the torques following the shift event. The method may also adapt the model between shift events and export the adapted model.

DETAILED DESCRIPTION

Figure 1:
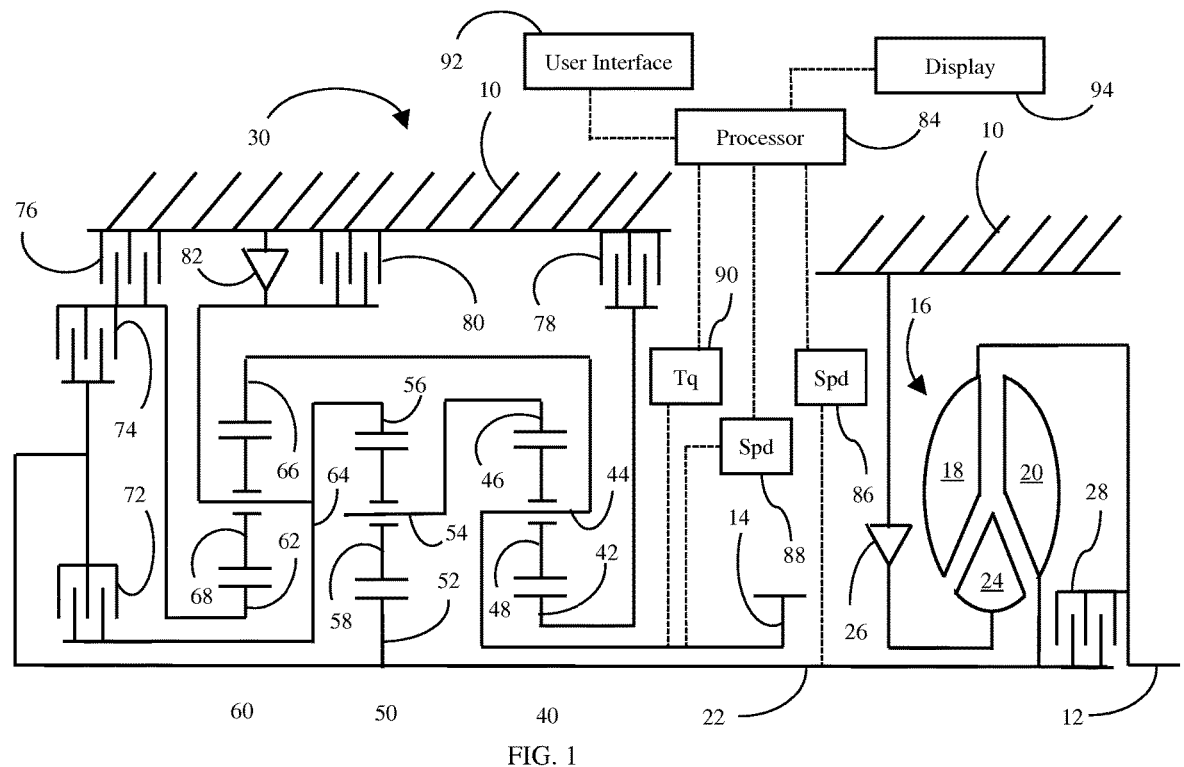
FIG. 1 is a schematic representation of a transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimensions. The model is not necessarily represented explicitly in the control strategy. The actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc. When the transmission differs from the model that was used to calibrate control strategy parameters, the behavior differs from the desired behavior.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms. A proportional term (p term) is proportional to the error, a derivative term (d term) is proportional to the derivative of the error, and an integral term (i term) is proportional to an integral of the error. Each closed loop term has a coefficient of proportionality. These coefficients are set during calibration such that, despite the presence of noise factors, the result converges rapidly toward the desired behavior with minimal oscillation.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate.

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

To calibrate the automatic transmission strategy, engineers establish an initial calibration and then observe the vehicle behavior in various maneuvers and adjust the calibration parameters to make the behavior more pleasing. The initial calibration may be established based on experience and based on the final calibration values of similar transmissions in similar vehicles. The vehicle used for calibration may be instrumented with additional sensors that would not be present on a production vehicle. The production controller may be replaced with a special calibration tool that runs the control strategy, gathers and records information from the sensors, and presents the information to the calibration engineers. Unlike a production controller, the calibration tool permits the calibration engineers to modify calibration parameters. Calibration parameters include scalar parameters such as the coefficients of proportionality in the closed loop terms. Calibration parameters also include the values in the many lookup tables used by the control strategy.

Calibration is an iterative process. After performing a maneuver, the calibrator must compare the observed behavior to the desired behavior, note the discrepancies, determine which calibration parameters would likely have impacted the behavior, determine how to adjust one or more of these parameters to improve the behavior, enter the adjustments in the calibration tool, and then repeat the maneuver. In some cases, the calibration engineer makes subjective determinations of whether the behavior was pleasing. However, this can lead to differences of opinion among calibrators. In other cases, the calibrator compares the observed behavior to an objective target behavior. The comparison is difficult if the objective target is not expressed in terms of the quantities measured by the instrumentation. For example, the objective target for a good torque phase during a shift may be expressed in terms of the torques and slip speeds of the on-coming and off-going shift elements. However, these quantities are difficult to measure directly. Therefore, the calibrator must either do significant off-line calculation or the objective target must be redefined in terms of measurable quantities that are less directly related to the desired behavior.

Even when the target behavior is expressed in terms of measurable quantities, determination of which calibration parameter to adjust can be very difficult. The behavior may have been influenced by a large number of calibration parameters. Narrowing down the candidates is much easier if the calibrator can view plots that describe exactly what occurred during the maneuver in terms of component speeds and torques as opposed to merely the measured quantities. For example, viewing only an output torque trace of an upshift may lead the calibrator to suspect that a tie-up occurred during the torque transfer phase. However, it would be difficult to determine whether the on-coming clutch was applied to quickly, whether the off-going clutch was released to slowly, or whether commanded changes to transmission input torque were mis-timed. Not only is adjustment of the wrong parameter less effective in improving the behavior in this maneuver, it is more likely to adversely impact other maneuvers. If the calibrator is able to view plots of the torque and speed of each component during the shift, he or she will be much better equipped to rapidly identify the best parameters to adjust.

A number of models will be discussed with reference to a particular transmission layout. Methods of utilizing these models to estimate unmeasured parameters are discussed with reference to a particular collection of available sensor readings. Finally, methods of adapting the models are discussed. Although the discussion references a particular transmission layout and sensor array, a person of skill in the art may apply the methods discussed to different transmission layouts and sensor arrays.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 46 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|  | 72 | 74 | 76 | 78 | 80/82 | Ratio | Step |
|---|---|---|---|---|---|---|---|
| Reverse |  | X |  |  | X | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift elements 72-80 may be hydraulically actuated multi-plate wet friction clutches or brakes. During the calibration process, a calibration tool is used as the controller, either by itself or in cooperation with the microprocessor that would be used in production. Processor 84 controls the pressure of transmission fluid routed to each shift element. This processor may adjust an electrical current to one or more variable force solenoids to control the pressure supplied to each clutch. When pressurized fluid is first supplied to a shift element, it moves a piston into a stroked position. Then, the piston forces plates together causing the shift element to transmit torque. The torque capacity is negligible until the piston reaches the stroked position. Once the piston reaches the stroked position, the torque capacity increases approximately linearly with the fluid pressure. When the pressure is relieved, a return spring moves the piston to a released (not stroked) position. The processor receives signals from a turbine speed sensor 86, an output speed sensor 88, and an output torque sensor 90. The calibration tool includes components that would not normally be present in a production vehicle, such as a user interface 92 and a display 94.

In order to estimate the speeds of particular elements and the torques on particular elements, in addition to the values measured by sensors 86-90, models are needed. Such models may be derived based on the speed and torque relationships of each of the components disregarding any parasitic power losses. If a group of components that are fixedly coupled to one another is modeled as a rigid element, then the sum of the torques exerted on that group, called a shaft, is proportional to the rotational acceleration of the shaft. The coefficient of proportionality is called the rotational moment of inertia, J, which can be estimated based on the dimensions and material density or can be measured experimentally.

$$\Sigma\tau = Ja$$

Gearbox 30 of FIG. 1 has 6 such shafts: turbine shaft 22 and sun 52; sun 42; output 14, carrier 44, and ring 66; carrier 54 and ring 46; carrier 64 and ring 56; and sun 62.

Disregarding parasitic losses, the speeds of the elements of a planetary gear set and their relative torques are related to the number of teeth on the sun gear, $N_{sun}$, and the number of teeth on the ring gear, $N_{ring}$. Specifically, for a simple planetary gear set, $$N_{sun}\omega_{sun} + N_{ring}\omega_{ring} = (N_{sun} + N_{ring})\omega_{carrier}$$

$$N_{ring}\tau_{sun} = N_{sun}\tau_{ring}$$

$$\tau_{sun} + \tau_{carrier} + \tau_{ring} = 0$$

For a double-pinion planetary gear set, $$N_{ring}\omega_{ring} - N_{sun}\omega_{sun} = (N_{ring} - N_{sun})\omega_{carrier}$$

$$N_{ring}\tau_{sun} = -N_{sun}\tau_{ring}$$

$$\tau_{sun} + \tau_{carrier} + \tau_{ring} = 0$$

A friction clutch selectively couples two elements, called the hub and the shell. In the examples herein, the top edge of the clutch symbol in FIG. 1 will be treated as the shell and the bottom edge of the symbol will be treated as the hub, although the choice is arbitrary. The torques applied to each element are a function of the clutch torque capacity, $\tau_{cap}$, and relative speeds of the elements. Specifically, $$\begin{cases} \tau_{hub} = \tau_{cap} & \text{if } \omega_{hub} < \omega_{shell} \\ \text{abs}(\tau_{hub}) \leq \tau_{cap} & \text{if } \omega_{hub} = \omega_{shell} \\ \tau_{hub} = -\tau_{cap} & \text{if } \omega_{hub} > \omega_{shell} \end{cases}$$

$$\tau_{hub} + \tau_{shell} = 0$$

Disregarding parasitic losses, the torque capacity of a released clutch is zero.

A calibration tool can generate a model of a gearbox using a description of the gearbox structure, the equations above, and a clutch application chart. Specifically, the inputs to the calibration tool include: i) a list of planetary gear sets and layshaft gear pairs indicating gear tooth numbers for each gear, ii) a list of shafts specifying which gearing elements are fixed to or form each shaft, iii) the moment of inertia of each shaft, iv) a list of shift elements indicating which shafts are selectively coupled by each clutch, v) a list of speed sensors indicating which shaft speed each speed sensor measures, vi) a list of torque sensors indicating what torque each measures, vii) a list of supplemental torque estimation models, viii) a list of fixed ratio gear states indicating which shift elements are applied to establish each, and ix) a list of shifts between fixed gear ratio states.

Figure 2:
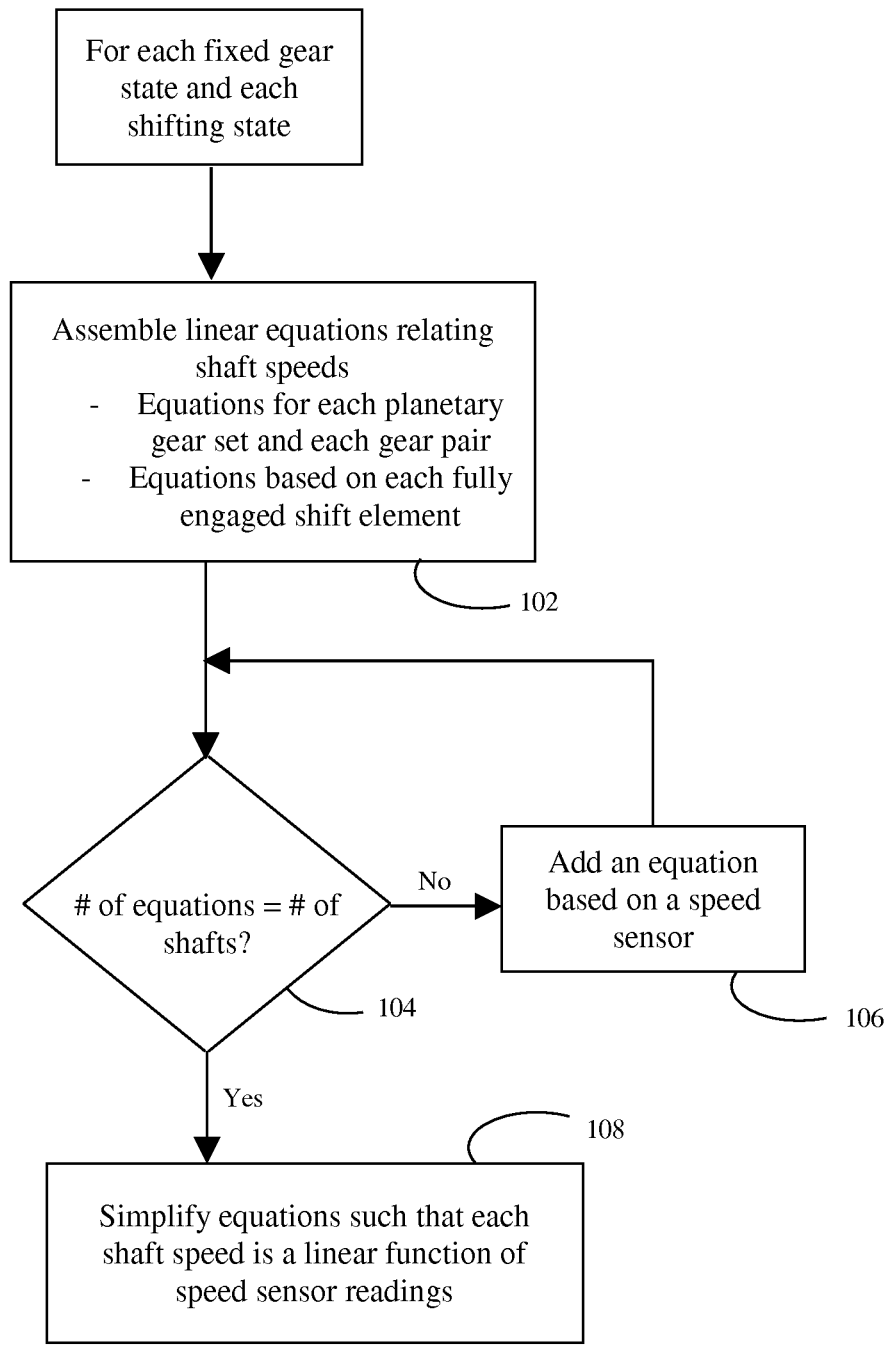
FIG. 2 is a flow chart for developing a model to predict the speeds of gearbox elements based on a topology description.

FIG. 2 illustrates a process of developing a models to estimate component speeds as a function of measured speeds. The model estimates speeds of each shaft. Since each gear element either forms a shaft by itself or is fixed to a shaft, each gear element speed is equal to one of the shaft speeds. The slip speed across each shift element is either equal to one of the shaft speeds (for brakes) or is equal to the difference between two shaft speeds. The model includes a separate set of equations for each fixed gear state and for each shifting state. At 102 the calibration tool uses the information input to assemble a list of linear equation that are applicable in each respective state. These include equations based on the gears and equations based on the fully engaged clutches. Specifically, every fully engaged clutch gives rise to an equation either setting a shaft speed to zero (for brakes) or setting two shaft speed equal to one another. If the number of equations is less than the number of shafts, as determined at 104, then additional equations are added at 106 based on measurements from speed sensors. Specifically, these equations set a shaft speed equal to the corresponding measured speed. The number of equations based on speed sensors may vary from state to state. For example, fixed ratio states require one speed sensor based equation while shifting states with a single on-coming element and a single off-going element require two speed sensor based equations. At 108, the equations are simplified such that each shaft speed is a linear function of speed sensor readings.

Figure 3:
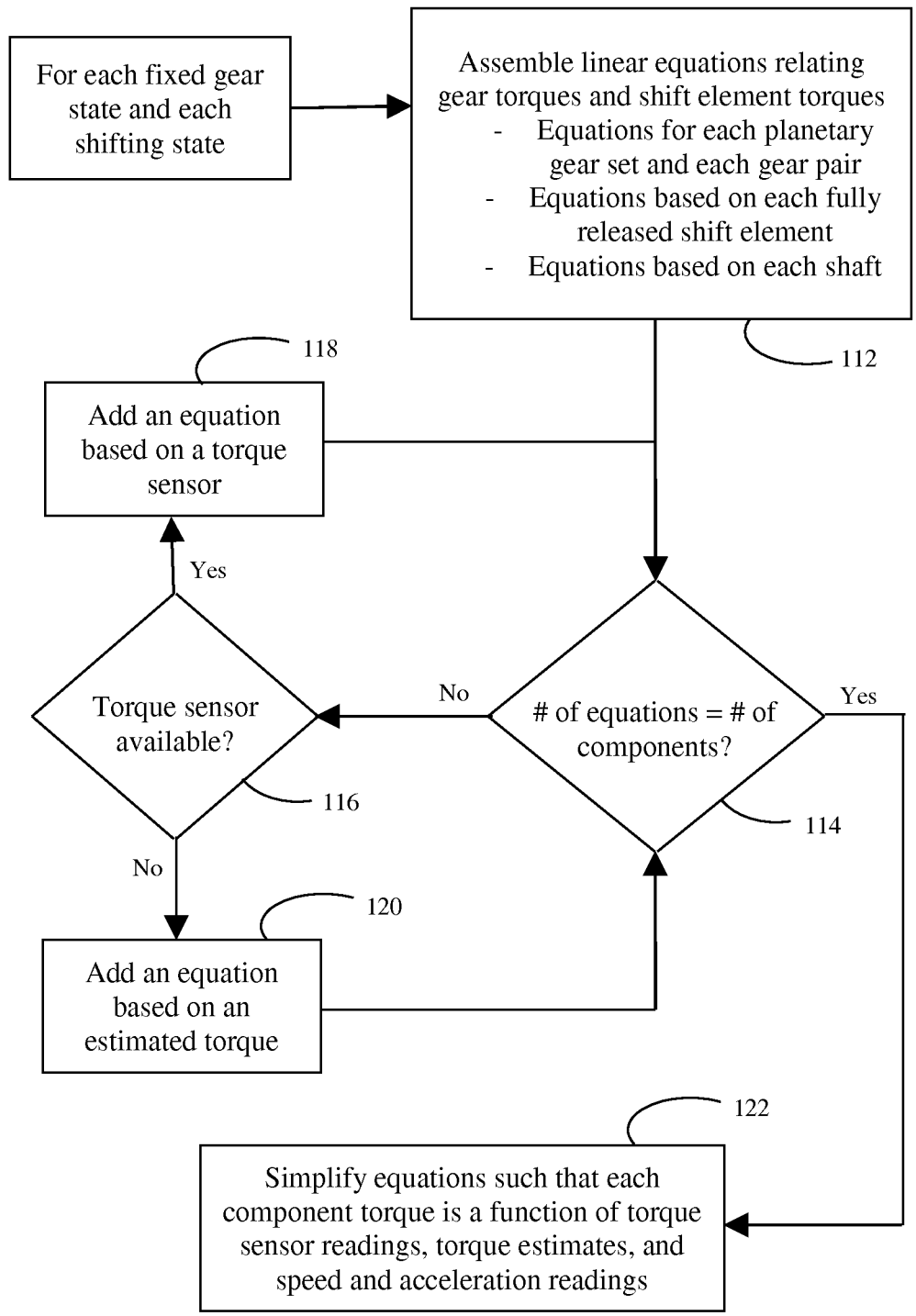
FIG. 3 is a flow chart for developing a model to predict the torques exerted by gearbox elements based on a topology description.

FIG. 3 illustrates a process of developing a model to estimate component torques as a function of measured torques, estimated torques, and measured shaft speeds and accelerations. At 112, the calibration tool assembles linear equations relating the various gear torques and clutch torques. This includes equations based on gear relationships, equations based on fully released clutches, and equations based on the shaft equations, as discussed above. Additional equations are added until the number of equations equals the number of component torques to be computed, as determined at 114. At 116, the calibration tool determines if additional information is available from torque sensors. If so, an equation setting the corresponding torque equal to the torque sensor reading is added at 118. If not, an equation setting a torque equal to an estimated torque as produced by another model is added at 120. Examples of such other models are estimates of gearbox input torque based on engine models, torque converter models, and lockup clutch models as discussed below. At 122, the equations are simplified if possible to reduce computation when using the model. The model produced by the methods of FIGS. 2 and 3 are called the detailed gearbox model because they estimate torques and speeds for each component as opposed to estimating lumped properties.

For gearbox 30 in FIG. 1, each of the three planetary gear sets provide one equation relating the speeds of the six shafts. When the gearbox is engaged in a particular gear ratio (not shifting), the two engaged clutches each provide one equation relating the speeds of the shafts. With six shafts and five equations, we must have one measured speed in order to be able to calculate all of the speeds. This additional speed could be provided by turbine speed sensor 86 or by output speed sensor 88. For example when third gear is engaged (clutch 74 and brake 78 engaged), the speeds of the six shafts can be determined by simultaneously solving the six equations:

$N_{42}\omega_{42}+N_{46}\omega_{46,54}=(N_{42}+N_{46})\omega_{14,44,46}$ (from gear set 40)

$N_{52}\omega_{22,52}+N_{56}\omega_{56,64}=(N_{52}+N_{56})\omega_{46,54}$ (from gear set 50)

$N_{62}\omega_{62}+N_{66}\omega_{14,44,66}=(N_{62}+N_{66})\omega_{56,64}$ (from gear set 60)

$\omega_{22,52}=\omega_{62}$ (from clutch 74 being engaged)

$\omega_{42}=0$ (from brake 78 being engaged)

$\omega_{14,44,66}$=measured

The second speed sensor may be used to confirm that third gear is in fact engaged. Each speed is proportional to the measured speed. The equations can be solved in advance to find the coefficient of proportionality for each shaft for each gear ratio.

For gearbox 30, there are 21 element torques to be calculated, three for each planetary gear set, two for each clutch, plus the input torque and the output torque. Each of the three planetary gear sets provides two torque equations. Each of the five shift elements provides one torque equation. Each of the six shafts provides one torque equation. (By convention, output torque is defined as the torque exerted by the gearbox on the output, whereas other torques are defined as the torque exerted by the component on the shaft. Therefore, output torque appears on the opposite side of the shaft torque equation from component torques.) Each shaft equation requires the shaft acceleration which is determined by numerically differentiating the shaft speed. Collectively, this provides 17 torque equations. When the gearbox is engaged in a particular gear ratio, the three disengaged clutches each provide an additional torque equation. Therefore, one sensed torque is required, which is provided by torque sensor 90. For example when third gear is engaged, the torques can be determined by simultaneously solving the 21 equations:

$N_{46}\tau_{42}=N_{42}\tau_{46}$ $\tau_{42}+\tau_{44}+\tau_{46}=0$ $N_{56}\tau_{52}=N_{52}\tau_{56}$ $\tau_{52}+\tau_{54}+\tau_{56}=0$ $N_{66}\tau_{62}=N_{62}\tau_{66}$ $\tau_{62}+\tau_{64}+\tau_{66}=0$ $\tau_{hub\ 72}+\tau_{shell\ 72}=0$ $\tau_{hub\ 74}+\tau_{shell\ 74}=0$ $\tau_{hub\ 76}+\tau_{shell\ 76}=0$ $\tau_{hub\ 78}+\tau_{shell\ 78}=0$ $\tau_{hub\ 80}+\tau_{shell\ 80}=0$ $\tau_{input}+\tau_{22}+\tau_{shell\ 72}+\tau_{hub\ 74}=J_{22,52}\alpha_{22,52}$ $\tau_{42}+\tau_{hub\ 78}=J_{42}\alpha_{42}$ $\tau_{44}+\tau_{66}-\tau_{output}+J_{14,44,66}\alpha_{14,44,66}$ $\tau_{46}+\tau_{54}=J_{46,54}\alpha_{46,54}$ $\tau_{56}+\tau_{64}+\tau_{hub\ 72}+\tau_{hub\ 80}=J_{56,64}\alpha_{56,64}$ $\tau_{62}+\tau_{shell\ 74}+\tau_{hub\ 76}=J_{62}\alpha_{62}$ $\tau_{hub\ 72}=0$ (from clutch 72 being disengaged)

$\tau_{hub\ 76}=0$ (from brake 76 being disengaged)

$\tau_{hub\ 76}=0$ (from brake 80 being disengaged)

$\tau_{output}$=measured

These equations can be manipulated such that each torque is expressed as a sum of two terms, one term proportional to the measured torque and the other proportional to the measured acceleration. The coefficients of proportionality can be determined in advance for each gear ratio. The hub and shell torque of the applied shift elements, 74 and 78 in this example, indicate a lower limit on the respective shift element torque capacity. However, the actual torque capacity cannot be determined using this model.

The above detailed gearbox model disregards parasitic losses. However, the model can be modified to account for some types of parasitic losses. For example, a disengaged shift element does not necessarily have zero torque capacity. This type of parasitic drag can be accounted for in the model by calculating the torque capacity of disengaged clutches as a function of the speeds of the hub and the shell, or as a function of the speed difference. Windage losses can be accounted for by adding a windage term in each shaft torque equation where the windage term is a function of the shaft speed. Mesh efficiency can be accounted for by slightly increasing or decreasing the tooth counts in the equation that relates the sun gear torque to the ring torque. Whether the tooth count is increased or decreased depends on the relative speeds and the direction of the torque. When losses are modeled this way, the individual component torques can still be computed based on a single measured speed and a single measured torque, although it may not be possible to pre-simplify the equations.

An alternative approach to modeling parasitic losses is to model the aggregate losses of the gearbox. The aggregate power loss of the gearbox may be tabulated as a function of the measured speed and measured torque and possible other factors such as fluid temperature. This table may be populated empirically using a dynamometer, using detailed component models, or some combination of the two. One disadvantage of using an aggregate loss model is that it is not as amenable to calculating individual component torques as a detailed component by component loss model. If loss models are available for individual components, an aggregate gearbox loss model may be automatically generated by running the detailed gearbox model with a variety of potential measured speeds and measured torques and populating a table of estimated aggregate gearbox losses. The individual component models may be entered into the calibration tool by a user or default models for various types of components may be used. For example, the default model for gears may assume 98% efficiency for each gear mesh.

During a shift between ratios, the calculations of component torque must be modified. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element is gradually reduced and the torque capacity of the on-coming shift element is gradually increased. During this phase, there is little or no slip across the off-going shift element but considerable slip across the on-coming shift element. When the off-going shift element torque capacity reaches zero, the power flow path associated with the upshifted gear is established. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the inertia phase, the torque capacity of the on-coming shift element is gradually increased while the torque capacity of the off-going element is reduced to zero.

During the shift, neither the on-coming nor the off-going shift element can be assumed to have zero slip. Although it may be intended for the off-going shift element to have zero slip during the torque phase of an upshift and for the on-coming shift element to have zero slip during the torque phase of a downshift, the controller cannot assume this to be the case. Therefore, one of the component speed equations that is used when the transmission is in a fixed gear is not available during the shift. Consequently, equations based on both speed sensors 86 and 88 must be included to calculate all of the shaft speeds. In some shifts, more than one clutch is released and more than one clutch is engaged. In such shifts, more than two shafts speeds must be determined with sensors.

Similarly, during the shift, neither the on-coming nor the off-going shift element can be assumed to have zero torque capacity. Although it may be intended for the on-coming shift element to have zero torque capacity during the preparatory phase of an upshift and during the inertia phase of a downshift, the controller cannot assume this to be the case. Sometimes, the pressure intended to merely stroke the piston actually causes a torque capacity increase. Therefore, one of the component torque equations that is used when the transmission is in a fixed gear is not available during the shift. If the transmission is not equipped with a second torque sensor, then a model may be used to estimate the input torque to provide the additional component torque equation.

$$\tau_{input} = \tau_{turbine} + \tau_{hub\ 28}$$

When torque converter lock-up clutch 28 is disengaged, the torque at the hub of lock-up clutch 28 is zero. Therefore, a model of the torque converter can provide the additional torque estimate needed during shifting. For a particular torque converter geometry (diameter, blade angles, etc), the hydro-dynamic torques exerted on the torque converter elements are functions of the turbine speed and the impeller speed. Environmental factors, such as fluid temperature, may also impact the relationship to some degree. A suitable torque converter model is described in U.S. Patent Publication 2013/0345022 which is incorporated by reference herein. Specifically, $$\tau_{impeller} = f1(\omega_{impeller}/\omega_{turbine}, \text{temp}, \ldots)\omega_{impeller}^2$$

$$\tau_{turbine} = f2(\omega_{impeller}/\omega_{turbine}, \text{temp}, \ldots)\omega_{impeller}^2$$

$$\tau_{turbine} + \tau_{impeller} + \tau_{stator} = 0$$

The functions f1 and f2 can be determined experimentally and entered into the calibration tool as tables. The turbine speed is directly measured using sensor 86. The impeller speed is equal to the engine crankshaft speed and can be obtained using a third speed sensor or by communication with an engine controller.

When lock-up clutch 28 is engaged, on the other hand, a model of the engine torque can provide the additional torque estimate needed during shifting. The transmission controller may obtain the current engine torque estimate by requesting it from the engine controller which maintains an engine torque model. Specifically, $$\tau_{engine} + \tau_{impeller} + \tau_{shell\ 28} = J_{12}\alpha_{12}$$

When lock-up clutch 28 is fully engaged, the impeller torque is zero. When the lock-up clutch is slipping, the hydro-dynamic model above may be used to estimate the impeller torque.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the valve body. A valve in the valve body responds by adjusting the pressure in a fluid circuit in proportion to the force generated by the solenoid. The fluid is routed to a clutch apply chamber where it pushes a piston to compress a clutch pack with interleaved friction plates and separator plates. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is zero. Beyond the current required to overcome the return spring, the torque capacity increases linearly with respect to the current. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. A dynamic model of the hydraulically actuated shift element may account for the time delay while the piston moves from the released position to the stroked position. A shift element model can be entered into the calibration tool in a variety of formats. There may be a table that relates torque capacity to electrical current, the relationship may be represented by a gain term and a stroke current, or various physical dimensions may be entered from which the calibration tool can estimate the relationship between torque capacity and electrical current.

At each time step, the controller determines a desired torque capacity for each shift element and then determines what electric current to command to the corresponding solenoid using the shift element model. This open loop control method, however, is subject to inaccuracy due to various noise factors. When a torque capacity estimate based on a measurement is available, the inaccuracies can be reduced using closed loop terms. When a clutch is slipping, such as the on-coming element in an upshift torque phase or the off-going element in a downshift torque phase, the gearbox model described above provides such an estimate. Furthermore, the estimated torque capacity can be used to adaptively revise the shift element model. Consequently, control is improved even when the shift element is not slipping, such as the off-going element in an upshift or the on-coming element in a downshift.

When the transmission is in a fixed gear ratio, there are multiple models which predict gearbox input torque. This provides an opportunity to adaptively refine one or both models. One estimate is produced by the gearbox model in combination with a torque sensor reading and a speed sensor reading. This model may include component parasitic loss models or an aggregate parasitic loss model. When lock-up clutch 28 is fully engaged, a second gearbox input torque estimate is based on an engine model. If the estimates differ, the engine model may be modified to bring that estimate closer to the gearbox based estimate. Alternatively, or additionally, the aggregate gearbox loss model may be modified to bring the gearbox based estimate closer to the engine model based estimate. Similarly, when lock-up clutch 28 is disengaged, a second gearbox input torque estimate is based on a torque converter model. If the estimates differ, the torque converter model, the aggregate gearbox loss model, or both may be modified to bring the estimates closer together. Also, when lock-up clutch 28 is disengaged, both the engine model and the torque converter model estimate impeller torque. If these two estimates differ, one or both models may be modified to bring the estimates closer together.

Several of the models described above can be represented in processor 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, the aggregate gearbox loss model for 3rd gear may be represented as a three dimensional lookup table based on gearbox input torque, gearbox input speed, and temperature. If the model includes multiple output variables, it may be represented by multiple lookup tables. For example, the torque converter model may have one lookup table for impeller torque and another lookup table for turbine torque.

To find a value for a model output variable based on particular values of the model input variables, the processor finds the stored points that are closest to the particular values and then interpolates. For example, to find the predicted gearbox losses at 1200 rpm input speed and 75 Nm input torque, the processor may interpolate between the stored loss values at (1000 rpm, 70 Nm), (1500 rpm, 70 Nm), (1000 rpm, 80 Nm), and (1500 rpm, 80 Nm). To find an input variable corresponding to a desired output variable, reverse interpolation is used. For example, to find the open loop pressure command for a desired clutch torque capacity of 95 Nm, the processor may interpolate between a stored point that yields 92 Nm and a stored point that yields 96 Nm. This reverse interpolation yields a unique solution only when the underlying function is monotonic. Alternatively, the model may be re-formulated such that torque capacity is an input variable and commanded pressure is an output variable.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. In the example above, stored gearbox loss estimates at (1000 rpm, 70 Nm), (1500 rpm, 70 Nm), (1000 rpm, 80 Nm), and (1500 rpm, 80 Nm) were used to predict gearbox losses at 1200 rpm input speed and 75 Nm input torque. If the interpolation yields an estimate of 1.5 Nm of loss and the observed loss is 2.5 Nm, those four stored values might each be increased by 0.2 Nm such that a new estimate at the same operating point would be 1.7 Nm. For stability, the adaptation is not allowed to change the stored values by too much at once. The adaptation may be restricted in various ways. For example, adaptation may only be allowed when the operating point is sufficiently close to one of the stored values. In this example, adaptation may not be performed for the observation at 1200 rpm and 75 Nm but may be allowed for operating points within 100 rpm at 2 Nm of one of the stored values. Also, there may be pre-defined bounds outside which adaptation is not performed. For example, in the gearbox loss model, stored values may not be permitted to become negative since actual losses would never be negative. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

During operation of a transmission, there are several operating conditions in which more than one model is available to predict a particular parameter. In such a circumstance, the controller may select one of the estimates as the trusted value. This selection may be based on a priori information about which model tends to be more accurate. The selection may also be based on other criteria such as when the inputs to one model are relatively constant and the inputs to the other model are changing rapidly making the former model more trustworthy. The controller may utilize the trusted value to adapt the less trusted model, making the less trusted model more trustworthy in other circumstances. Alternatively, the controller may select a value that is a weighted average of the multiple estimates, with weighting factors based on the degree of trust of each model. In that case, both models may be subject to adaptation to bring the estimates closer to the selected value. This approach is most useful if each model is also adapted in other circumstances based on independent models. If one model is correct and the other model is inaccurate, the correct model will be re-adapted toward its original prediction in those other circumstances.

Figure 4:
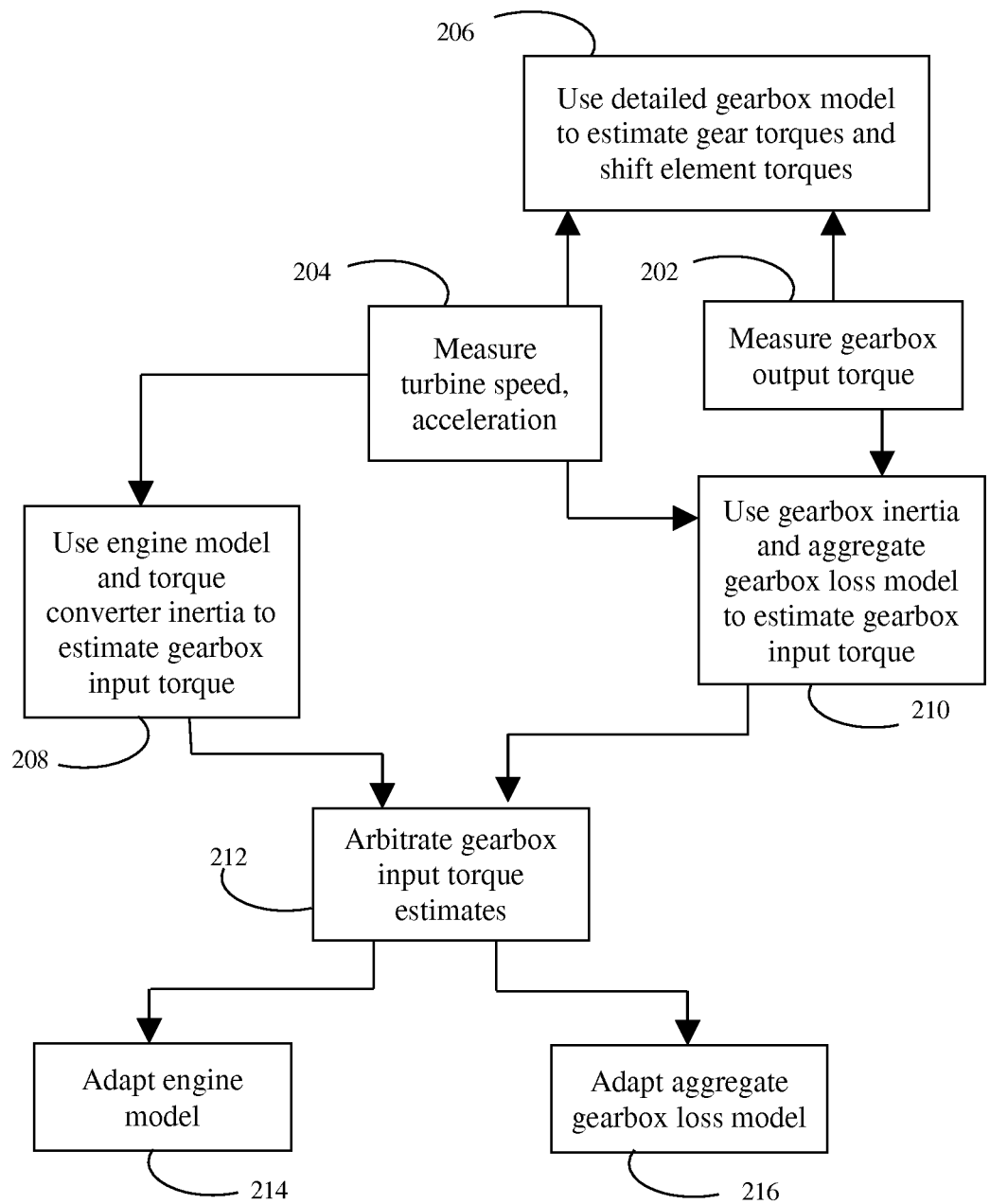
FIG. 4 is a flow chart for operating a transmission in a fixed gear ratio with the torque converter lockup clutch fully engaged.

FIG. 4 illustrates a process for operating a transmission, such as the transmission of FIG. 1, when the torque converter lockup clutch 28 is fully engaged and the transmission is to remain in the current gear ratio. This process is repeated at regular intervals while the transmission remains in this condition. The gearbox output torque is measured at 202 using torque sensor 90, for example. The turbine speed is measured at 204 using speed sensor 86, for example. The acceleration rate of the turbine may be determined by numerically differentiating the turbine speed signal or may be measured by a separate sensor. Since the turbine speed and the engine speed are equal in this operating condition, an engine speed sensor or impeller speed sensor could be used instead of a turbine speed sensor. At 206, a detailed gearbox model is used to estimate the torques of each transmission component of interest, such as gears and shift elements. These torques are proportional to the gearbox output torque measured at 202 corrected for parasitic losses, which may be based on the speed measured at 204, and inertia effects based on the acceleration measured at 204. In this condition, the gearbox input torque is equal to the engine torque after accounting for any torque used to accelerate the torque converter inertia. Therefore, the gearbox input torque may be computed at 208 based on an engine model and the acceleration measured at 204. The gearbox input torque may also be computed at 210 using a gearbox aggregate loss model, the gearbox output torque measured at 202, and correcting for inertia based on the acceleration measured at 204. Since two estimates of gearbox input torque are available, the controller arbitrates between these estimates at 212. For example, the arbitration routine may use a weighted average of the two estimates with the weighting factors based on prior assessments of the trustworthiness of each model. If either model produces a result that is considered unreasonable, the arbitration routine may disregard that estimate and use the other estimate. At 214 and 216, the controller uses the resulting estimate to adapt the engine model and aggregate loss model respectively. In this condition, the controller commands a high pressure to each engaged shift element for the current gear ratio to ensure that the clutches remain fully engaged.

Figure 5:
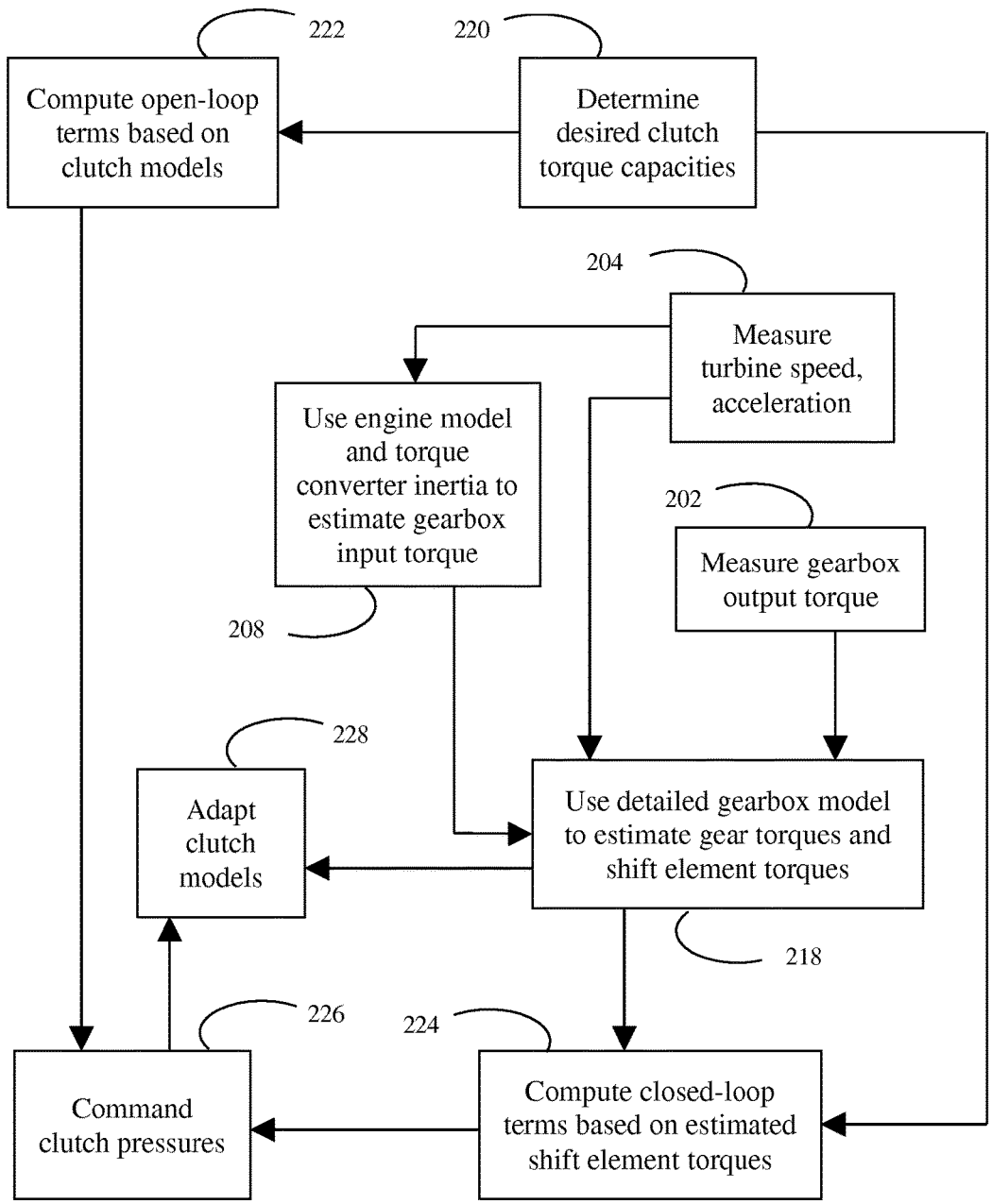
FIG. 5 is a flow chart for shifting a transmission with the torque converter lockup clutch fully engaged.

FIG. 5 illustrates a process for operating a transmission during a shift when the torque converter lockup clutch is fully engaged. This process is repeated at regular intervals during the shift. Steps that are common with FIG. 4 use the same reference number. At 218, the detailed gearbox model is used to estimate the torques of each transmission component of interest, such as gears and shift elements. During the shift, the detailed gearbox model requires two input torque values, so both the measured torque from 202 and the estimated gearbox input torque from 208 are utilized. The desired clutch torque capacities, as required to generate the desired shift feel, are computed at 220. At 222, a clutch model for each clutch is used to calculate the pressure required to produce the desired torque, which is used as an open loop term for clutch pressure control. At 224, the difference between the desired clutch torque capacity and the corresponding estimates from 218 is used to compute closed loop terms. At 226, the control commands a pressure equal to the sum of the open loop term and the closed loop terms. At 228, the commanded pressure from 226 and the estimated shift element torque from 218 may be used to adapt the clutch models, such that future shifts are improved due to reduced reliance on closed loop feedback.

Figure 6:
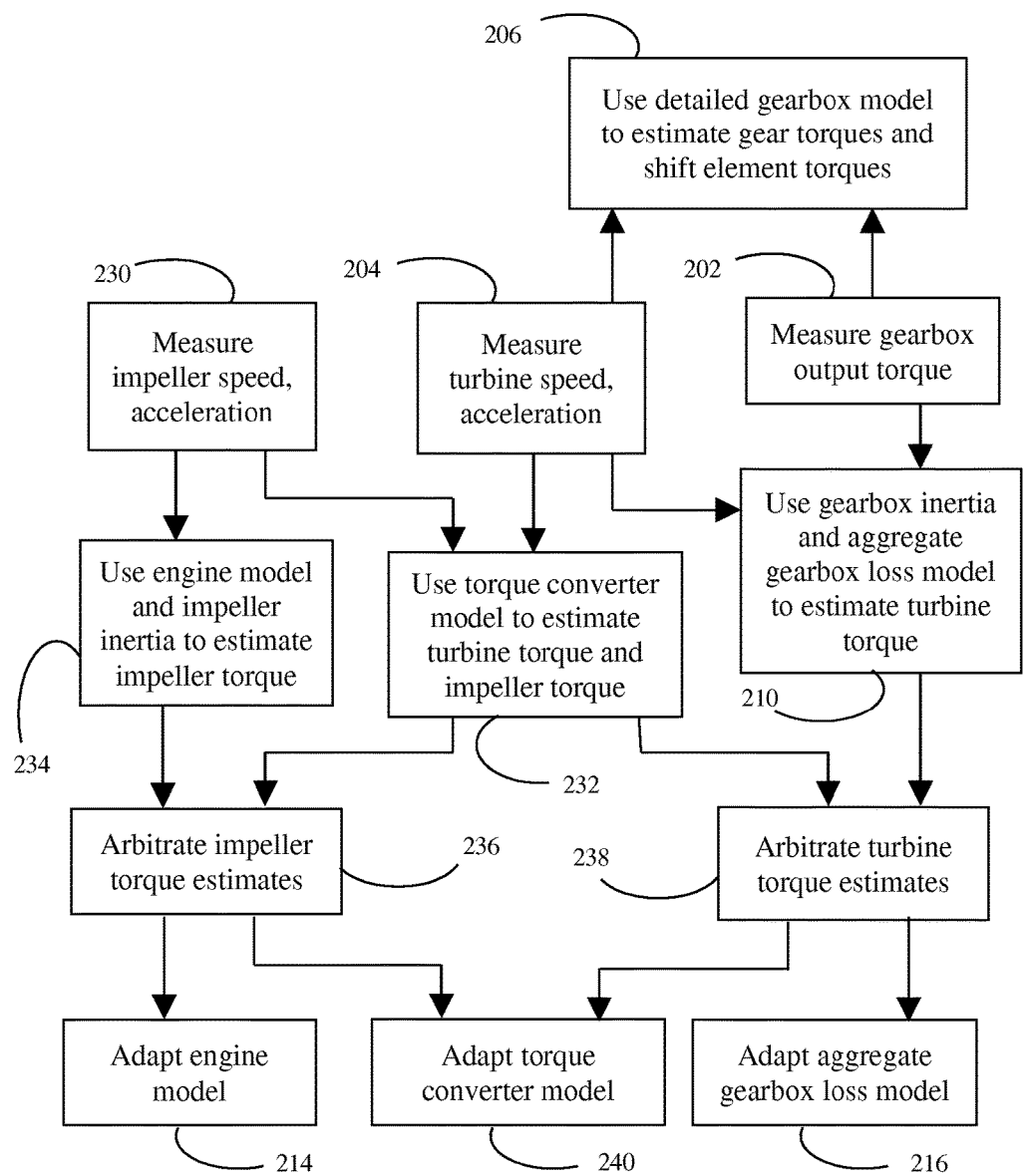
FIG. 6 is a flow chart for operating a transmission in a fixed gear ratio with the torque converter lockup clutch fully disengaged.
Figure 7:
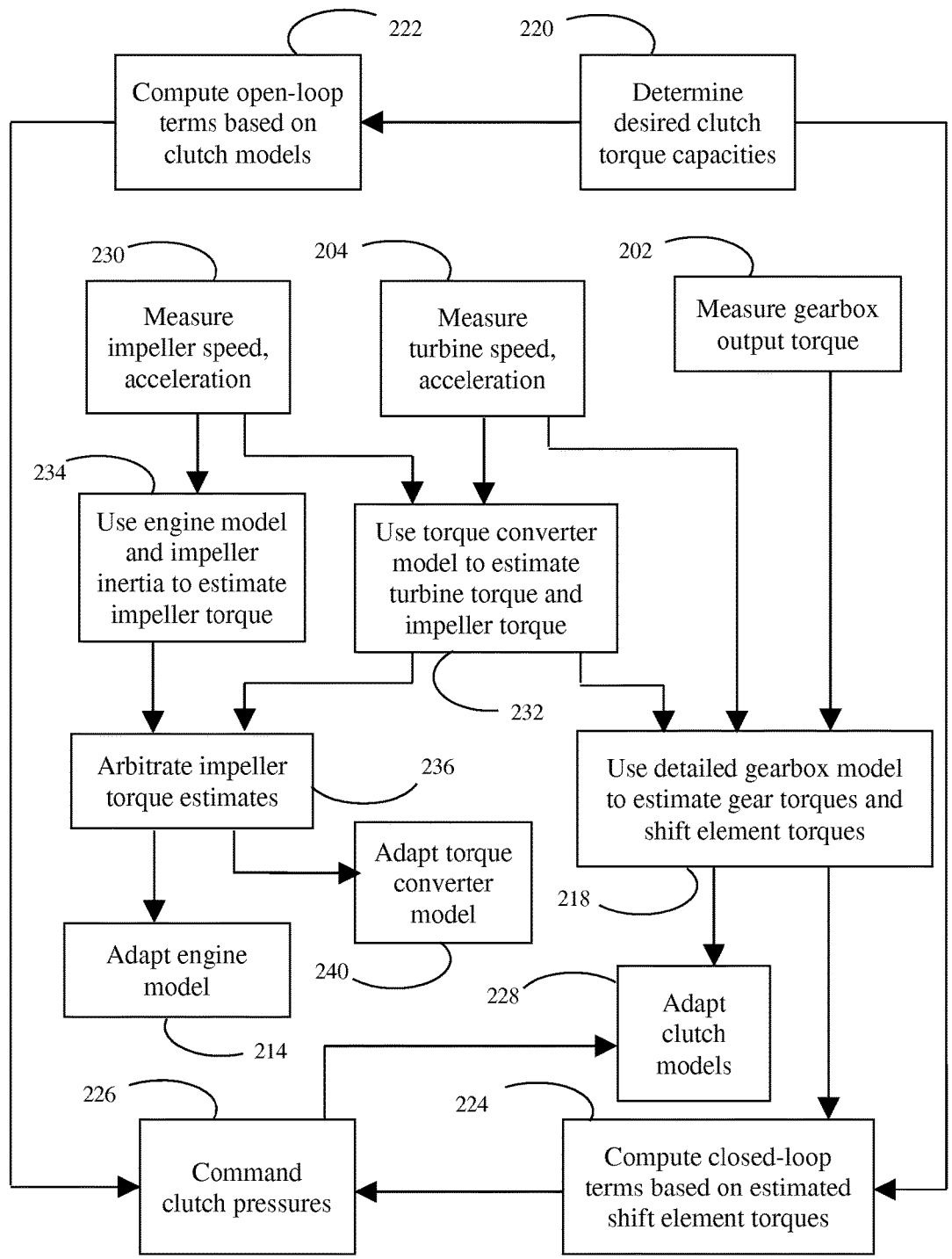
FIG. 7 is a flow chart for shifting a transmission with the torque converter lockup clutch fully disengaged.

FIG. 6 illustrates a process for operating a transmission when the torque converter lockup clutch is fully disengaged and the transmission is to remain in the current gear ratio. This process is repeated at regular intervals while the transmission remains in this condition. As in the process of FIG. 4, a turbine torque estimate is generated at 210 based on measured gearbox output torque, turbine speed, and turbine acceleration, using an aggregate gearbox loss model. Additionally, impeller speed and acceleration are measured at 230. At 232, a torque converter model is used with the measured impeller speed and measured turbine speed to estimate the impeller torque and the turbine torque. At 234, the engine model is used to produce a second estimate of impeller torque. Since there are two estimates of impeller torque and two estimates of turbine torque, arbitration is performed at 236 and 238 to select values. The selected values may be used to adapt the engine model, torque converter model, and aggregate gearbox loss model at 214, 240, and 216 respectively. FIG. 7 illustrates a process for operating the transmission during a shift when the torque converter lockup clutch is fully disengaged. As in the method of FIG. 5, both the turbine torque and the gearbox output torque are used at 218 with the detailed gearbox model to estimate the shift element torques. These shift element torques estimates may be used at 228 to adapt the corresponding clutch models. Since only one turbine torque estimate is produced, only the impeller torque aspect of the torque converter model is adapted at 240.

Figure 8:
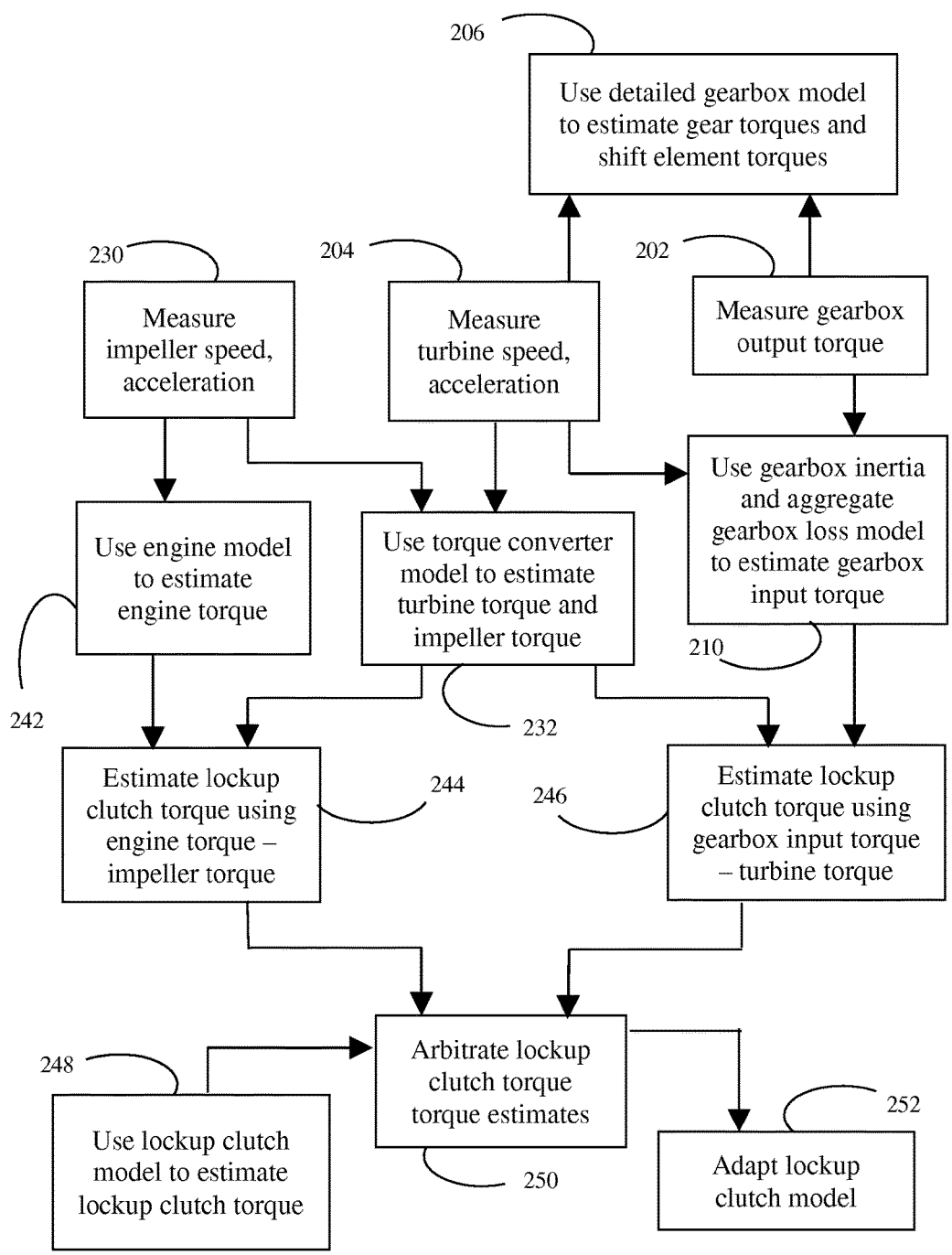
FIG. 8 is a flow chart for operating a transmission in a fixed gear ratio with the torque converter lockup clutch partially engaged.
Figure 9:
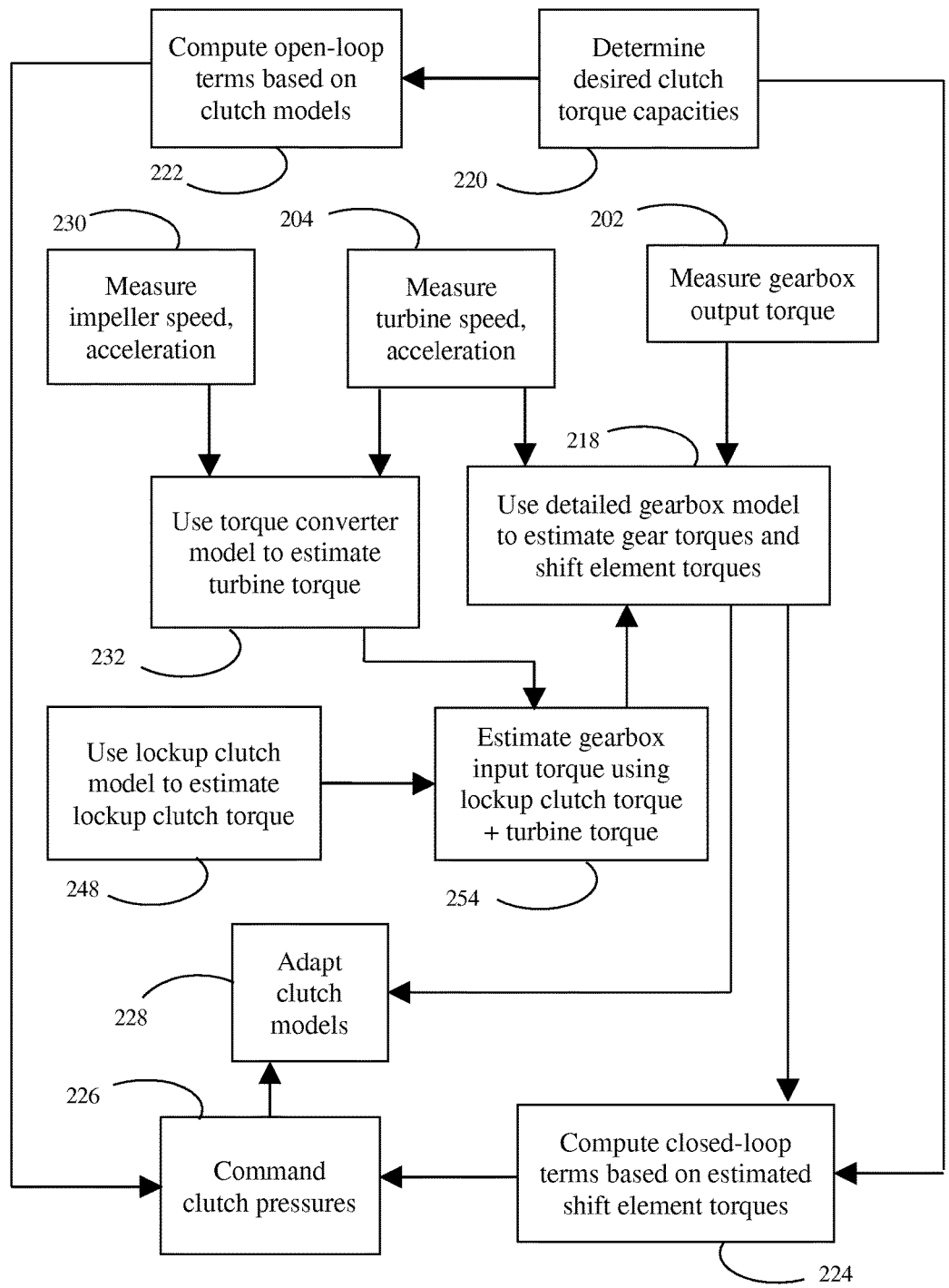
FIG. 9 is a flow chart for shifting a transmission with the torque converter lockup clutch partially engaged.

FIG. 8 illustrates a process for operating a transmission when the torque converter lockup clutch is partially engaged and the transmission is to remain in the current gear ratio. This process is repeated at regular intervals while the transmission remains in this condition. In this condition, the gearbox input torque is the sum of the turbine torque and the lockup clutch torque. Similarly, the engine torque is the sum of the lockup clutch torque and the impeller torque. The gearbox input torque is estimated at 210 based on the measured gearbox output torque and the aggregate loss model. The turbine torque and impeller torque are estimated at estimated at 232 based on measured impeller and turbine speeds. The engine torque is estimated at 242 based on the measured impeller speed, which is equal to the engine speed. The lockup clutch torque is estimated in three ways. At 244, the lockup clutch torque is estimated by subtracting the impeller torque estimate from the engine torque estimate. At 246, the lockup clutch torque is estimated by subtracting the turbine torque estimate from the gearbox input torque estimate. At 248, the lockup clutch torque is estimated using a lockup clutch model. The arbitrated lockup clutch torque estimate produced at 246 is then used to adapt the lockup clutch model at 248. FIG. 9 illustrates a process for shifting the transmission while the lockup clutch is slipping. At 254, the gearbox input torque is estimated by adding the estimated clutch torque produced by the lockup clutch model at 248 to the turbine torque estimate produced at 232.

Figure 10:
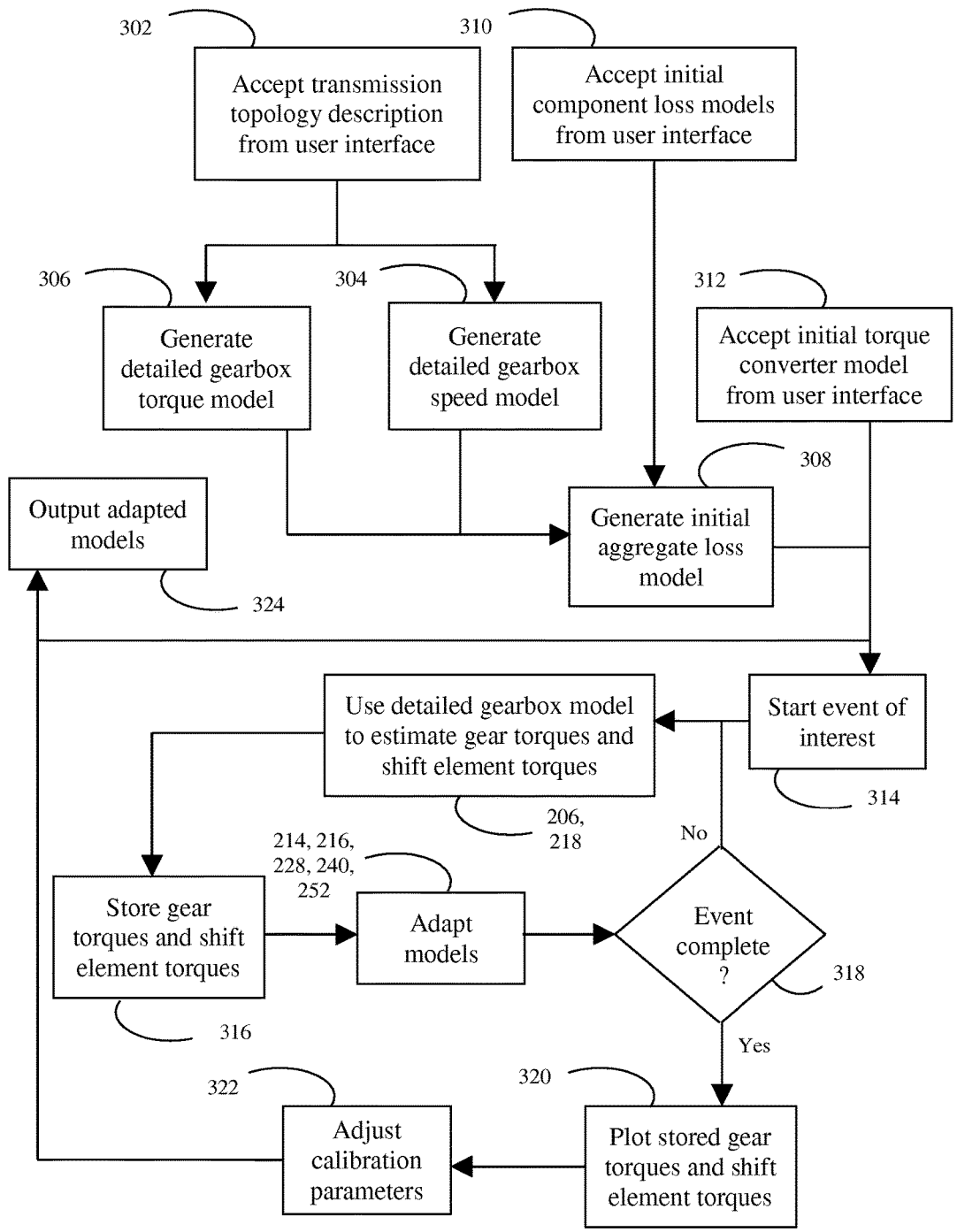
FIG. 10 is a flow chart for utilizing a calibration tool to assist in calibrating a transmission design.

FIG. 10 illustrates a process for using a calibration tool to assist in calibrating a transmission. At 302, the user interface 92 accepts a description of the transmission topology. The topology description includes a list of gear elements (planetary gears like sun gears, carriers, and ring gears, meshing layshaft gears, sprockets and chains), a list of fixed connections among gear elements, and a list of shift elements (brakes, clutches) indicating which gear elements are selectively coupled by each shift element. The topology description also includes a list of gear states ($1^{st}$ gear, $2^{nd}$ gear, shifting between $1^{st}$ gear and $2^{nd}$ gear, etc.) indicating which shift elements are fully engaged to establish the gear state and which others may be partially engaged. Finally, the topology description includes a list of sensors, including speed sensors and torque sensors. At 304 and 306, the processor utilizes this information to produce component speed models and component torque models in each gear state using the procedures of FIGS. 2 and 3 respectively. At 308, the processor utilizes these models to generate an initial aggregate loss model. The processor may produce the initial model assuming idealized components or may utilize initial component loss models accepted via the user interface at 310. At 312, the user interface accepts an initial torque converter model, such as tables relating impeller torque and turbine torque to impeller speed, turbine speed, and environmental factors such as temperature. These steps may be performed in the vehicle or may be performed in preparation for in vehicle calibration activities.

At 314, the calibration engineer drives the vehicle to initiate the event of interest, such as a shift event. During a shift event, the process of FIG. 5, 7, or 9 is executed at regular intervals, depending on the state of torque converter bypass clutch 28. Between shift events, the process of FIG. 4, 6, or 8 is executed at regular intervals, depending on the state of torque converter bypass clutch 28. Using the detailed gearbox model developed at 304 and 306, the processor computes the torques on every gearbox component of interest at either 206 or 218, depending on whether a shift is in progress or not. These estimated torques are stored in memory at 316. The various models are adapted at 214, 216, 228, 240, or 252 as described above. If the event of interest is still ongoing, as determined at 318, the process continues estimating component torques, recording the estimates, and adapting the models. At the completion of the event, at 320, the calibration tool generates plots of various component torques as a function time during the event. If, after viewing the plots and experiencing the event, the calibration engineer decides to make an adjustment to calibration parameters, they may be adjusted via the user interface at 322 and the event repeated. The calibration engineer may also request that the adapted values be output at 324 for inspection. These adapted models may provide useful insight into the actual functioning of the transmission.

Figure 11:
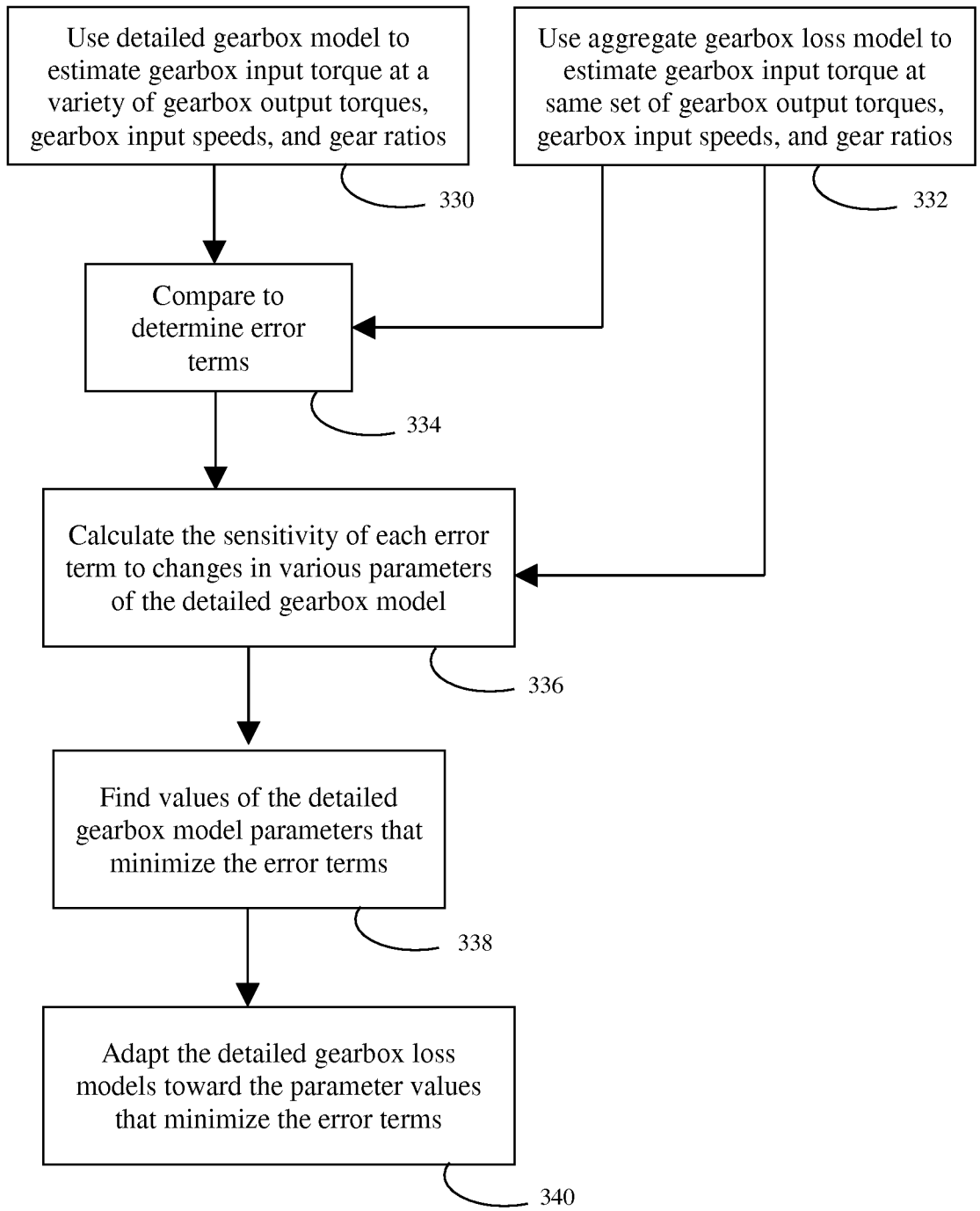
FIG. 11 is a flow chart for adapting a detailed gearbox model based on an aggregate gearbox loss model.

FIG. 11 illustrates a process for adapting the detailed gearbox model. This process is executed much less frequently than the processes of FIGS. 4-9. This process propagates the gradual adaptation of the aggregate gearbox loss model to the detailed gearbox model. Stochastic adaptation may be unsuitable for this because many parameters in the detailed gearbox model may contribute, to varying degrees, to the losses at a particular operating point. A stochastic adaptation algorithm may be unable to determine which parameter to adapt. However, since the relative contribution differs at different operating points, it may be possible to identify which parameter to adjust after observing an appropriate variety of operating points. At 330, the detailed gearbox model is used to estimate the gearbox input torque corresponding to a variety of gearbox output torques, gearbox input speeds, and gear ratios. The collection of output torques, input speeds, and gear ratios may be predetermined or may be derived from the operating points observed since the previous execution of the process. At 332, the aggregate gearbox loss model is used to estimate the gearbox input torque at the same collection of operating points. The values from the two models are compared at 334 to calculate a set of error terms. The number of error terms is equal to the number of operating points considered. At 336, the process computes the sensitivity of each error term to changes in various parameters of the detailed gearbox model. These parameters may be, for example, particular values in lookup tables. Computing the sensitivities may involve repeating the calculations from 330 and 334 with each parameter slightly perturbed from its nominal value. The number of parameters should be equal to or larger than the number of operating points. At 338, revised parameter values that minimize the error terms are computed. This may involve, for example, a least squares curve fit. Finally, at 340, the parameter values are adapted toward the values calculated at 338. To avoid instability, the process may adjust the parameter values to an intermediate value between the original value and the value computed at 338. The adapted component loss models may be output at 324 in similar fashion to other adapted models to inform engineers if any of the components are causing more parasitic drag than anticipated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission calibration tool comprising:
   a user interface configured to accept a transmission topology description including a list of gearing components, a list of fixed connections among the gearing components, an input shaft, a turbine shaft, and an output shaft, a list of shift elements, a list of transmission states indicating which shift elements are engaged to establish each state, a list of speed sensors, and a list of torque sensors;
   a transmission interface configured to accept input signals from the speed sensors and the torque sensors;
   a processor programmed to monitor the input signals during a shift event and to estimate torques exerted by gear elements or shift elements at intervals during the shift event based on the input signals and the topology description; and
   a display configured to plot the torques after the shift event.

2. The calibration tool of claim 1 wherein:
   the user interface is further configured to accept a torque converter model relating a turbine torque to a turbine speed and an impeller speed;
   the input signals include an impeller speed signal and a turbine speed signal; and
   the processor is further programmed to estimate the turbine torque based on the impeller speed signal and the turbine speed signal and to utilize the turbine torque estimate to estimate the torques exerted by the gear elements and the shift elements.

3. The calibration tool of claim 2 wherein the processor is further programmed to adapt the torque converter model between shift events based on an independent estimate of the turbine torque.

4. The calibration tool of claim 1 wherein:
the user interface is further configured to accept an engine model to predict a transmission input torque; and
the processor is further programmed to utilize a transmission input torque estimate to estimate the torques exerted by the gear elements and the shift elements.

5. The calibration tool of claim 4 wherein the processor is further programmed to adapt the engine model between shift events based on an independent estimate of the transmission input torque.

6. The calibration tool of claim 1 wherein:
the input signals include an output torque signal; and
the processor is further programmed to utilize a gearbox loss model to estimate the torques exerted by gear elements and shift elements.

7. The calibration tool of claim 6 wherein the processor is further programmed to adapt the gearbox loss model between shift events based on an independent estimate of a gearbox input torque.

8. The calibration tool of claim 7 wherein the user interface is further configured to output the adapted gearbox loss model.

9. A transmission calibration tool comprising:
a user interface configured to accept a transmission topology description;
a transmission interface configured to accept input signals from a speed sensor and a torque sensor;
a processor programmed to, at intervals during a shift event, estimate a torque exerted by a transmission component based on the input signals and the topology description; and
a display configured to plot the torque estimates.

10. The calibration tool of claim 9 wherein the transmission topology description comprises:
a list of gearing components;
a list of fixed connections among the gearing components, an input shaft, a turbine shaft, and an output shaft;
a list of shift elements;
a list of transmission states indicating which shift elements are engaged to establish each state;
a list of speed sensors; and
a list of torque sensors.

11. The calibration tool of claim 9 wherein the transmission component is a gear.

12. The calibration tool of claim 9 wherein the transmission component is a shift element.

13. A method comprising:
accepting a description of a transmission topology;
developing a model, based on the transmission topology, that relates transmission component torques to one or more speed sensor signals and one or more torque sensor signals;
during a shift event, estimating transmission component torques based on the model, the speed sensor signals, and the torque sensor signals; and
after the shift event, displaying the estimated component torques.

14. The method of claim 13 wherein the transmission topology description comprises:
a list of gearing components;
a list of fixed connections among the gearing components, an input shaft, a turbine shaft, and an output shaft;
a list of shift elements;
a list of transmission states indicating which shift elements are engaged to establish each state;
a list of speed sensors; and
a list of torque sensors.

15. The method of claim 13 wherein the transmission component torques comprise torques exerted by gears.

16. The method of claim 13 wherein the transmission component torques comprise torques transmitted by shift elements.

17. The method of claim 13 further comprising adapting the model between shift events based on an independent estimate of a gearbox input torque.

* * * * *